B. SZAKACS.
RESILIENT WHEEL.
APPLICATION FILED JUNE 9, 1917.

1,252,736.

Patented Jan. 8, 1918.
2 SHEETS—SHEET 1.

Inventor
Bertalan Szakacs
By his Attorney
Oscar Geier

Inventor
Bertalan Szakacs
By his Attorney
Oscar Geier

UNITED STATES PATENT OFFICE.

BERTALAN SZAKACS, OF HARDIEVILLE, ALBERTA, CANADA.

RESILIENT WHEEL.

1,252,736.  Specification of Letters Patent.  Patented Jan. 8, 1918.

Application filed June 9, 1917. Serial No. 173,677.

*To all whom it may concern:*

Be it known that I, BERTALAN SZAKACS, a subject of the King of Hungary, resident of Hardieville, Province of Alberta, and Dominion of Canada, have invented certain new and useful Improvements in Resilient Wheels, of which the following is a specification.

This invention relates to improvements in resilient wheels, and has as it special object the provision of means whereby a plurality of segments, forming the tread, may move independently one with relation to the other when the wheel is under stress or in passing over obstructions upon the roadway surface.

This and other like objects are attained by the novel construction and combination of parts hereafter described and shown in the accompanying drawings, forming a material part of this specification, and in which:—

Figure 1:
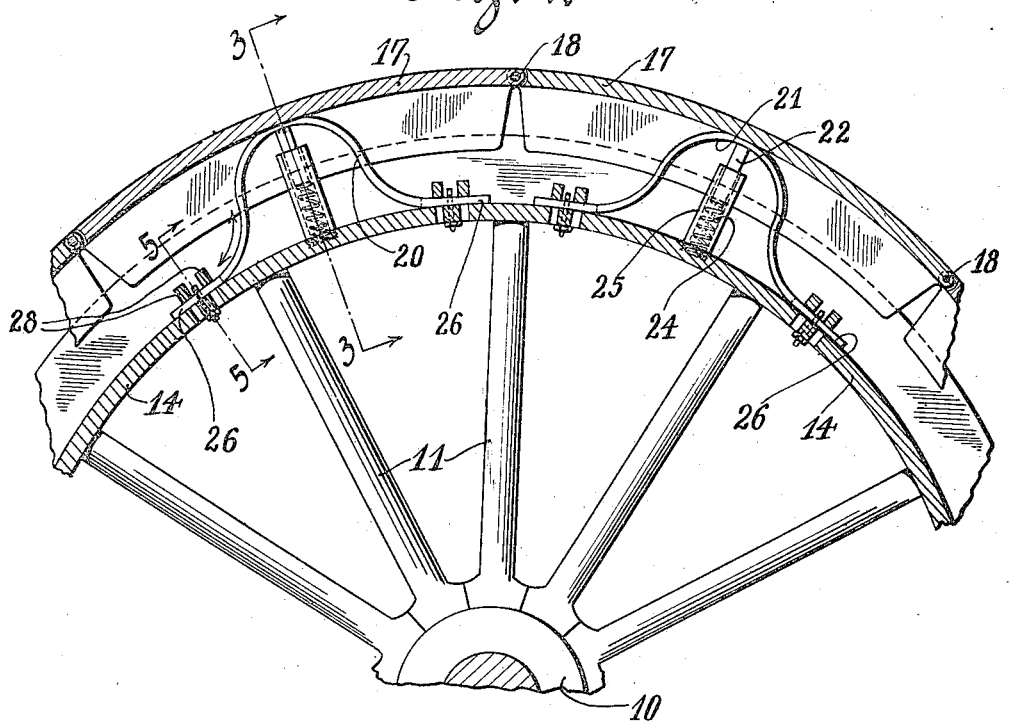
Figure 1 is a fragmental vertical longitudinal sectional view taken through a tire made in accordance with the invention.
Figure 2:
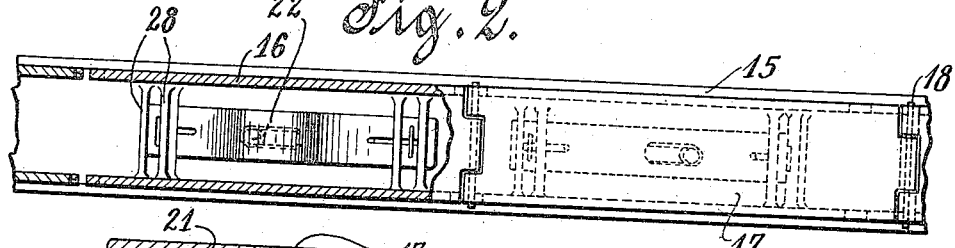
Fig. 2 is a partial top plan view of the same, the tread having been partially removed.
Figure 3:
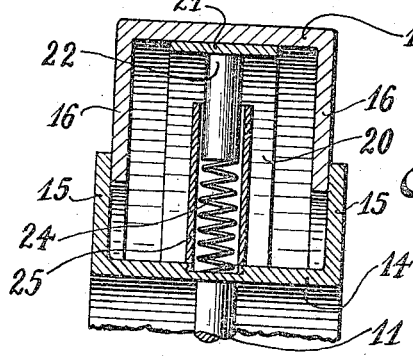
Fig. 3 is an enlarged transverse sectional view taken on line 3—3 of Fig. 1.
Figure 4:
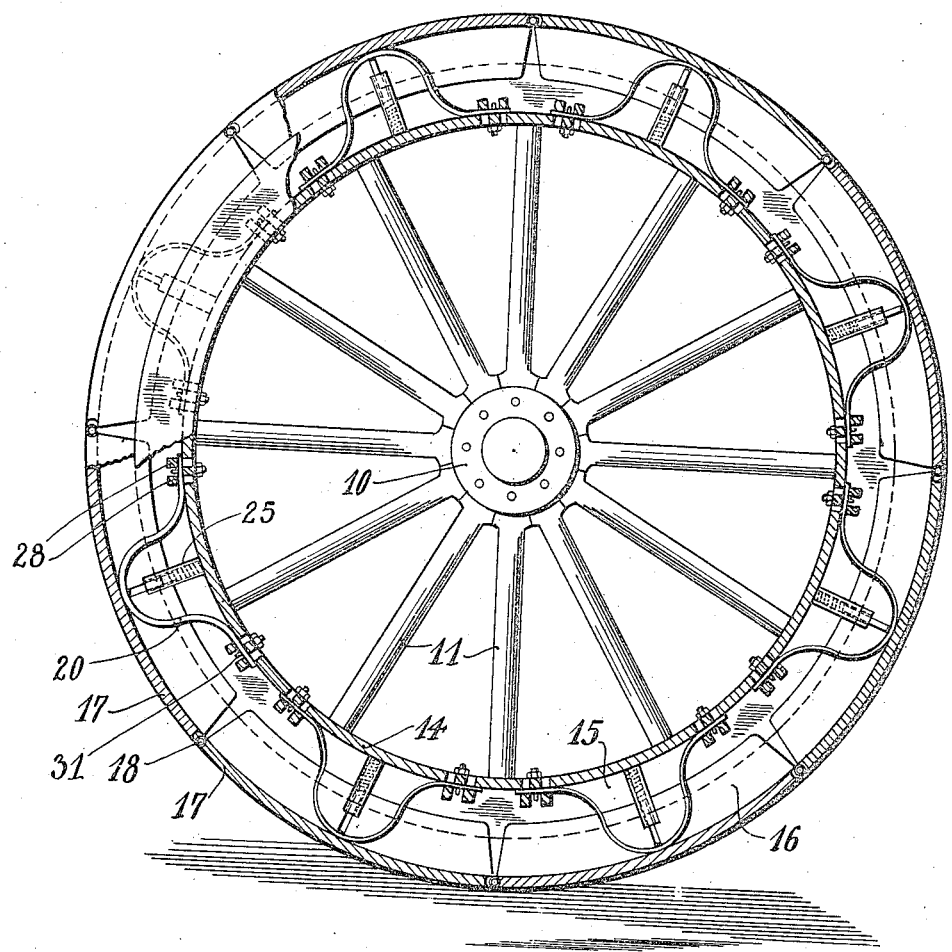
Fig. 4 is a side elevational view of a complete wheel, parts being broken away in order to show the interior construction.
Figure 5:
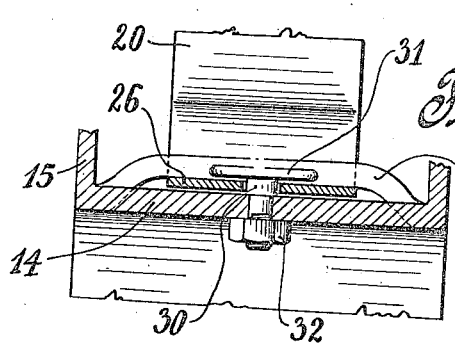
Fig. 5 is a transverse sectional view drawn to an enlarged scale, the section being taken on line 5—5 of Fig. 1.

Engaged with the rigid hub 10 are a plurality of radial spokes 11, the outer ends being secured in an inner rim 14, having integrally formed, lateral flanges 15, closely engaged with which are the inturned annular flanges 16, formed with the tread segments 17, the parts forming in effect a box-like structure.

The tread comprises a plurality of segments joined together at their ends by the hinges 18, and maintained outwardly against the load pressure by arcuately formed flat springs 20, the loops 21 of which bear against the centers of the segments, and are re-inforced by the plungers 22, normally pressed outward by the springs 24, contained in bushings 25 secured to the inner rigid rim 14.

The extending ends 26 of the arcuate springs 20 also bear upon the periphery of the rigid rim 14 and are held in relative position thereto by passing through loops 28 forced out of the rim 14, while centrally between the loops are positioned bolts 30 having enlarged heads 31, bearing upon the spring ends, and held in position by means of the nuts 32, the bolts passing through elongated slots formed in the ends of the springs.

Thus as the wheel operates, each of the several segments 17 may be materially depressed so far as the springs 20 and 24 will permit, the segments yielding at the hinges 18, while at the same time, the ends 26 of the springs 20 may move longitudinally below the loops 28, but are limited in their action by means of the bolts 30.

Having thus described my invention, what I claim as new, and desire to secure by Letters Patent, is:—

1. In a resilient wheel, the combination with a rigid hub, having a plurality of spokes extending therefrom, and a rigid rim engaged by said spokes, of a plurality of segmental tread sections, hinges formed at the adjacent ends of said sections, flanges formed on said sections adapted to be received within said rigid rim, an arcuate spring for each of said segmental tread sections, loops formed integrally with said rigid rim adapted to embrace the ends of said arcuate springs whereby the latter are held in relative position, and a plurality of bolts passing through the ends of said springs.

2. In a resilient wheel, the combination with a rigid fixed rim, and a plurality of segmental tread sections hingedly engaged together, of an arcuate spring disposed between each of said tread sections and said fixed rim, said springs having extending ends contacting with the periphery of said rim, loops integrally formed with said rim through which said ends extend and whereby they are prevented from lateral motion, and means for reinforcing said arcuate springs.

In testimony whereof I have affixed my signature.

BERTALAN SZAKACS.

Witness:
A. B. HOGG.

Copies of this patent may be obtained for five cents each, by addressing the "Commissioner of Patents, Washington, D. C."